United States Patent Office 3,349,146
Patented Oct. 24, 1967

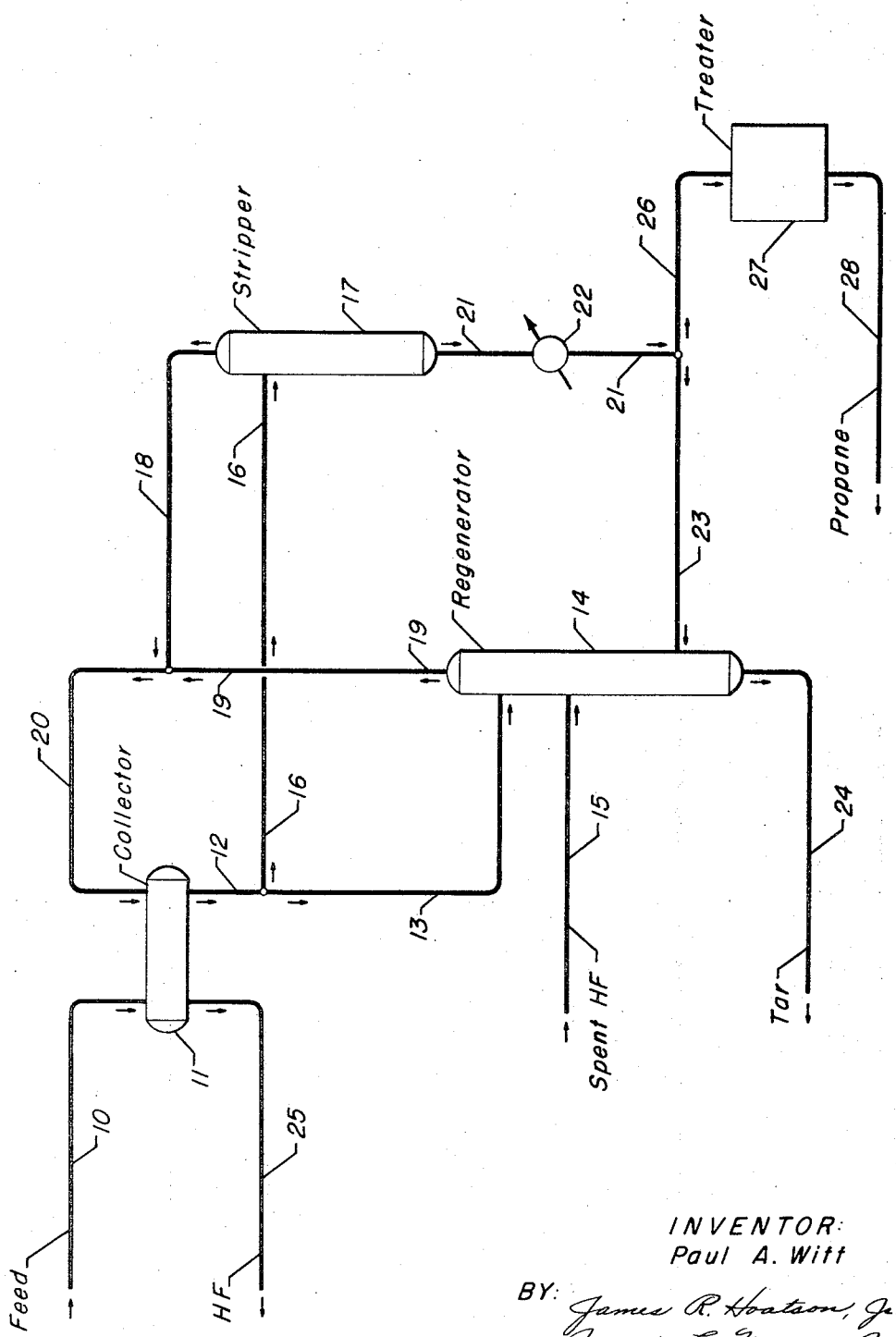

3,349,146
ALKYLATION CATALYST REGENERATION AND PURIFICATION OF C$_3$ EFFLUENT FRACTION
Paul A. Witt, Oak Park, Ill., assignor to Universal Oil Products Company, Des Plaines, Ill., a corporation of Delaware
Filed Dec. 1, 1966, Ser. No. 598,489
2 Claims. (Cl. 260—676)

This invention relates to a catalytic alkylation process. It particularly relates to an improved process for the separation of the hydrocarbon and acid components present in the effluent from a catalytic alkylation zone. It specifically relates to an improved method for regenerating hydrofluoric acid catalyst and recovering C$_3$ hydrocarbons in relatively pure form from the effluent of a catalytic alkylation reaction zone.

It is well known in the prior art that catalytic alkylation using hydrofluoric acid or sulfuric acid as the catalyst has become an important chemical tool for preparing alkylated hydrocarbons and derivatives thereof. The commercial and industrial demand for these products is exemplified with the demand for isoparaffin hydrocarbons and alkyl-substituted benzenes of gasoline boiling range and with the demand for alkyl-substituted aromatics suitable for conversion to surfactants, e.g., detergents, wetting agents, etc. The prior art process of alkylation generally is effected by contacting an isoparaffin hydrocarbon feed stock with an olefin hydrocarbon in the presence of a catalyst such as hydrofluoric acid in a suitable reaction vessel for conducting chemical reactions.

In practice, there have been numerous process schemes advanced by the prior art for accomplishing the alkylation reaction, but is extremely difficult to achieve a process scheme which embodies all of the desirable features of a completely optimum reaction. Optimizing the alkylation reaction is complicated by the fact that the alkylation reaction if not carried out properly has many side reactions, such as polymerization, which destroys the effectiveness of the reaction and inhibits the production of commercial quantities of desired alkylate. Additionally, the reaction, in order to be carried out commercially, requires a tremendous amount of auxiliary equipment for the recovery of the alkylate product, for the regeneration and reuse of the excess catalyst, and for the recovery and reuse of the excess reactants which have passed through the reaction system.

The catalytic alkylation process to which the present invention is applicable consists of a process in which a mixture of hydrocarbons containing isoparaffins such as isobutane, isopentane, and the like; and olefins such as propylene, butenes, isobutenes, and the like, are mixed intimately in the presence of a strong acid catalyst, such as hydrofluoric acid or sulfuric acid, at generally room temperatures or lower for sufficient time to complete the reaction. The effluent from the reaction zone contains saturated isoparaffin hydrocarbons of higher molecular weight or boiling point than the isoparaffin in the original mixture. For convenience, these higher molecular weight isoparaffin hydrocarbons which comprise the reaction product from the alkylation zone are called "alkylate." Isobutane has been used almost exclusively because of its reactivity and availability to produce the high quality alkylate product. In similar manner, among the olefins, butenes have been used almost exclusively, although in recent times a mixture of butenes and propylenes have also been used satisfactorily. In some cases it is also desirable to use solely propylene as the olefin reactant.

However, as is typical in most commercial chemical plants, the reaction between the isoparaffin hydrocarbon and the olefin hydrocarbon is performed with an excess of isoparaffin in the reaction zone. Accordingly, there is a large excess of the isoparaffin hydrocarbon remaining in the effluent from the reaction zone. Additionally, there is a significant quantity of C$_3$ hydrocarbons which pass through the system, and for economy sake, must be recovered in as high yield as possible. In similar manner, it is desirable to recover for reuse the isoparaffin reactant in as high yield as possible.

In processes of the type referred to above there is also a need for periodic regeneration of the catalyst system. This is usually accomplished by prior art schemes by taking a stream of at least a portion of the acid catalyst, e.g., hydrofluoric acid, and passing it to a regeneration column wherein the regenerated catalyst is stripped with, for example, hot or superheated isobutane. The purpose of this regeneration is to remove from the catalyst impurities such as water and acid soluble oils which accumulate in the system. These oils are of a polymeric composition which is in equilibrium with the alkylated hydrocarbon and heavy tar produced in the alkylation reaction. As used in this specification, these impurities and/or contaminants in the catalyst phase are for convenience lumped together and characterized as being material boiling above the boiling point of hydrogen fluoride or sulfuric acid as the case may be.

The prior art processes for regenerating liquid catalyst such as hydrofluoric acid catalyst usually involve distillation schemes which present problems both from a process standpoint and from an apparatus standpoint. For example, since it is an acid system, the presence of water will cause severe corrosion problems in the regeneration column and in any condensing means associated therewith. In addition, sufficient heat must be applied to the catalyst stream in order to vaporize the catalyst for recovery as a purified product. However, in the vaporization of this catalyst stream there will remain a non-vaporized residue of heavy organic diluent which tends to foul the tubes of the heat inducing means. Another problem present in the prior art processes is the difficulty of providing sufficient stripping media so that the acid losses to the tar residue are minimized. If sufficient stripping media is passed into the regeneration column so that no acid will remain in the bottom product, there is frequently entrained overhead an excessive portion of heavy organic diluent which then contaminates the vaporized catalyst stream thereby creating additional fouling problems in the lines and condensing means associated with the regeneration system.

Accordingly, it is an object of the present invention to provide a process for regenerating spent alkylation catalyst and recovering hydrocarbon reactants and diluents which are present in the effluent from a catalytic alkylation zone.

It is a specific object of this invention to provide a recovery process for the various constituents contained in the effluent from a catalytic alkylation zone in a more facile and economical manner.

It is a specific object of this invention to provide a process for regenerating spent hydrofluoric acid alkylation catalyst and recovering C$_3$ hydrocarbons substantially free from hydrogen fluoride and alkyl-fluoride compounds.

The invention will be fully understood from a description presented hereinbelow with reference to the appended drawing which is a schematic representation of apparatus for practicing one embodiment of this invention.

According to the present invention, the objects and advantages are obtained by a process comprising introducing relatively cold C$_3$ hydrocarbons contaminated with hydrogen fluoride and alkyl-fluoride compounds into a collecting zone, introducing hydrogen fluoride contaminated with material boiling above hydrogen fluoride into fractionation means, passing a portion of said collected $C_3$ hydrocarbons into separation means under conditions sufficient to produce a first overhead fraction comprising hydrogen fluoride and a bottoms fraction comprising $C_3$ hydrocarbons and alkylfluoride compounds, heating at least a portion of said bottoms fraction, passing a portion of the heated bottoms fraction into the lower end of said fractionation means, passing another portion of said collected $C_3$ hydrocarbons into the upper end of said fractionation means; said fractionation means maintained under conditions sufficient to produce a second overhead fraction comprising regenerated hydrogen fluoride and $C_3$ hydrocarbons and a residuum comprising said material, returning said first and second overhead fractions to said collecting zone, withdrawing from the said zone a stream rich in hydrogen fluoride, subjecting another portion of the heated bottoms fraction to treatment under conditions sufficient to remove alkylfluoride compounds therefrom, and recovering $C_3$ hydrocarbons substantially free from hydrogen fluoride and alkyl-fluoride compounds.

A specific embodiment of this invention includes the process described above wherein said $C_3$ hydrocarbons comprise paraffinic hydrocarbons.

The description of the present invention will be limited to the processing scheme for handling the effluent from a conventional isobutane-propylene alkylation reaction zone, although the scope of the invention is not necessarily to be limited thereto. The effluent is prepared by means known to those skilled in the art, and generally, comprises the steps of comingling an olefin-containing feed stock with an isoparaffin-containing feed stock and passing the mixture into a conventional alkylation reactor vessel. An isobutane rich paraffinic hydrocarbon stream is also added to the reaction zone in order that the isoparaffin to olefin mol ratio in the presence of the catalyst is maintained at the proper level. Means for removing the heat of reaction from the reactor vessel must be provided and the contact time in the reactor is maintained for a period sufficient to intimately mix and contact the feed mixture with the catalyst so that the alkylation reaction can occur. The total effluent from the reaction zone is generally removed and passed into a separation means whereby the acid is separated from the hydrocarbon phase, generally by settling. The acid is returned to the process, preferably, by gravity flow in admixture with fresh acid, as needed, and the hydrocarbon phase is further processed in accordance with this invention. A portion of the acid phase being returned to the process is also regenerated by this invention in conjunction with the processing of the hydrocarbon phase.

Conventional alkylation conversion conditions are of temperature, pressure, isoparaffin-olefin mol ratio, and hydrogen fluoride-hydrocarbon volume ratio, can be employed advantageously in the reaction zone used to prepare the feed material for processing in accordance with the present invention. For example, the alkylation of isobutane with propylene can be carried out at temperatures between 0° F. and 100° F., preferably between 80° F. and 110° F., at pressures sufficiently high to keep the hydrocarbon and catalyst in liquid phase, and at isobutane-propylene mol ratios between 2:1 and 20:1, preferably between 10:1 and 15:1. Ratios of isobutane to propylene of at least 2:1 are essential since lower ratios tend to cause polymerization of the propylenes with resulting decrease in yield of desirable alkylate product. The volume ratio of catalyst to hydrocarbon charge can be varied considerably. For example, a ratio of 1:1 to 10:1 can be used, preferably at least 2:1 is used. The acid catalyst charged to the reactors can be substantially anhydrous hydrogen fluoride and can have a titratable acidity as low as 65% by weight, but preferably is maintained between 85% and 95% acidity.

As will become more evident from a detailed description of the present invention with reference to the appended drawing, operating in the manner generally described hereinabove, and utilizing the process of the present invention will produce an alkylate product having an end point below 400° F. and a leaded octane (at 3 cc.'s of TEL/gal. of alkylate) of at least 105 with a hydrogen fluoride catalyst consumption generally of less than 0.2 pounds of catalyst per barrel of alkylate produced. Additionally, significant economy of operation is achieved over the process schemes taught by the prior art.

As previously mentioned, hydrocarbons substantially free from a major proportion of hydrogen fluoride catalyst is withdrawn from the settler vessel associated with the alkylation reaction zone and introduced into a deisobutanizer column. The deisobutanizer column operates as a fractionation column and accomplishes a substantial separation between the propane, the lower boiling isobutane, the higher boiling n-butane, and the reactor effluent products, namely, the alkylate. A combination of isobutane flash and alkylated hydrocarbon stripping is accomplished in the deisobutanizer tower.

The n-butane present, if any, in the olefin feed material to the alkylation reactor plus the n-butane that is usually contained in the isoparaffin feed stream plus the small amount of n-butane frequently produced or added in the alkylation reaction must leave the system. For example, if this n-butane were allowed to accumulate in the system, its vapor pressure would become extremely high and no control of the vapor pressure of the product alkylate could be exercised without the use of a subsequent stabilizing step. In the design of modern alkylation systems, vapor pressure control of the alkylate product is achieved by withdrawing a vapor sidecut in the proper point of the deisobutanizer tower.

The deisobutanizer column overhead system accumulates $C_3$ hydrocarbons containing small quantities of hydrogen fluoride and alkyl-fluoride compounds plus other hydrocarbon such as isobutane are generally accumulated in a common condensing system. The common collector is the beginning point for the practice of the present invention.

Referring now to the drawing, relatively cold $C_3$ hydrocarbons contaminated with hydrogen fluoride and alkyl-fluoride compounds are passed via line 10 into collector 11. The material collected in collector 11 typically is at a temperature of about 100° F. and a pressure of about 315 p.s.i.g.; although, in the practice of this invention these actual temperatures and pressures may vary widely depending upon the precise composition of the materials being handled by those skilled in the art. A portion of the relatively cold hydrocarbons which are contaminated with the hydrogen fluoride and alkyl-fluoride compounds are passed directly into a stripping column for the purpose of removing the hydrogen fluoride from the propane. Conventionally, the HF stripper operates on a reboiler system wherein the bottom of the stripper column is reboiled by indirect heat exchange with low pressure steam. The overhead from the stripping column 17 is passed via lines 18 and 20 and returned to collector 11. As more fully discussed hereinbelow an alkylation catalyst stream comprising hydrogen fluoride is removed from collector 11 and passed via line 25, for example, to the alkylation reaction zone for further use as the catalyst therein.

Simultaneous with the passing of the relatively cold $C_3$ hydrocarbons via line 16 into stripper 17, a stream of spent hydrogen fluoride catalyst is introduced via line 15 into regenerator 14, within which the hydrogen fluoride will be regenerated by the separation therefrom of material boiling above the hydrogen fluoride. As previously noted, the material boiling above hydrogen fluoride comprises acid soluble oils, tars, constant boiling mixture comprising a complex of water and hydrocarbons which are removed from the system via line 24.

Referring again to stripper 17, a bottoms portion is removed from stripper 17 via line 21 and heated in heater 22. A portion of the heated bottoms fraction is passed into the bottoms section of regenerator 14 via line 23. Another portion of the relatively cold contaminated paraffinic hydrocarbons is passed from collector 11 via lines 12 and 13 into the upper section of regenerator 14. A regenerated hydrogen fluoride acid catalyst plus $C_3$ hydrocarbons are removed via line 19 and passed in conjunction with the overhead material from stripper 17 and line 18 into collector 11 via line 20.

It can thus be seen from the description presented so far that the heated bottoms fraction comprising $C_3$ hydrocarbons fed into regenerator 14 at the lower portion thereof acts as the stripping medium for that section of the column below the feed tray. Similarly, the relatively cold contaminated $C_3$ hydrocarbons fed into regenerator column 14 via line 13 acts as reflux on the column for overhead temperature control and also provides liquid runback on the trays above the feed point. Thus regenerator 14 is operated as a true fractionating column rather than only as a stripping column.

The upper portion of the heated bottoms fraction from stripper 14 is passed via line 26 into treater 27 for the removal therein of the alkyl-fluoride compounds. The treated $C_3$ hydrocarbon stream (propane) is removed from treater 27 via line 28 and passed from the process for use as, for example, fuel.

Treater 27 is commonly called a defluorination zone and may consist of one or more towers filled with alumina bauxite, aluminum rings, etc. for the removal of the alkyl-fluoride compounds which were contained in the feed (line 26). Treater 27 is usually operated at a pressure of about 300 p.s.i.g. and a temperature of about 400° F.

The operating conditions generally suitable for regenerator 14 include a feed temperature in the range from 200° F. to 300° F., preferably from 240° F. to 280° F. Heated bottoms in line 23 fed into the bottom of regenerator 14 is preferably superheated to a temperature from 350° F. to 500° F., preferably from 440° F. to 460° F. The use of the superheated hydrocarbon introduces sufficient heat into regenerator column 14, not only for stripping purposes in the stripping section of the column, but provides sufficient heat on the feed tray to decompose any alkyl-fluoride compounds which are present in the spent acid feed so that the residuum (tar) can be recovered substantially free from acid fluoride. The stripping section of the column is also preferably constructed with trays which have liquid holdups so that true stripping may be accomplished. However, other trays such as sieve plate trays may also be used since the only requirement in the stripping section is that there be intimate contact between the run-back liquid and the ascending vapors. Suitable heat should be supplied to provide a feed tray temperature of greater than 280° F., e.g., 280° F. to 300° F. in order to accomplish the decomposition of the fluoride complexes.

The relatively cold $C_3$ hydrocarbons contaminated with hydrogen fluoride and alkyl-fluoride complexes which are used as reflux in column 14 is typically passed into a column at a temperature from 85° F. to 125° F., preferably from 95° F. to 105° F. Sufficient quantities of this reflux stream should be used so that the overhead temperature of column 14 will not exceed 195° F. Usually the overhead temperature will be between 165° F. and 195° F., preferably no greater than 190° F.

The operating conditions found satisfactory for stripper 17 include an overhead temperature of 110° F. to 120° F., an overhead pressure from 300 p.s.i.g. to 325 p.s.i.g., a bottoms temperature from 130° F. to 160° F., and a bottoms pressure of from 300 p.s.i.g. to 330 p.s.i.g. Typically, stripper 17 is operated with an overhead temperature of about 117° F. and a bottoms temperature of about 146° F. with the feed in line 16 to stripper 17 being at a temperature of about 100° F.

It can thus be seen from the above description that the present invention provides a novel process for regenerating spent hydrogen fluoride acid catalyst while at the same time recovering $C_3$ hydrocarbons substantially free of hydrogen fluoride and alkyl-fluoride compounds. Additionally, the hydrogen fluoride acid catalyst is collected from the regeneration step and from the stripping step and therefore can be returned to the alkylation reaction zone for further use thereby effecting considerable economies of operation.

I claim:

1. Process comprising introducing relatively cold $C_3$ hydrocarbons contaminated with hydrogen fluoride and alkyl-fluoride compounds into a collecting zone, introducing hydrogen fluoride contaminated with material boiling above hydrogen fluoride into fractionation means, passing a portion of said collected $C_3$ hydrocarbons into separation means under conditions sufficient to produce a first overhead fraction comprising hydrogen fluoride and a bottoms fraction comprising $C_3$ hydrocarbons and alkyl-fluoride compounds, heating at least a portion of said bottoms fraction, passing a portion of the heated bottoms fraction into the lower end of said fractionation means, passing another portion of said collected $C_3$ hydrocarbons into the upper end of said fractionation means; said fractionation means maintained under conditions sufficient to produce a second overhead fraction comprising regenerated hydrogen fluoride and $C_3$ hydrocarbons and a residuum comprising said material, returning said first and second overhead fractions to said collecting zone, withdrawing from said zone a stream rich in hydrogen fluoride, subjecting another portion of the heated bottoms fraction to treatment under conditions sufficient to remove alkyl-fluoride compounds therefrom, and recovering $C_3$ hydrocarbons substantially free from hydrogen fluoride and alkyl-fluoride compounds.

2. Process according to claim 1 wherein said $C_3$ hydrocarbons comprise paraffinic hydrocarbons.

No references cited.

DELBERT E. GANTZ, *Primary Examiner.*

H. LEVINE, *Assistant Examiner.*